Sept. 2, 1924.
R. M. WASON
GUIDE FORMER
Filed Sept. 18, 1922
1,507,535
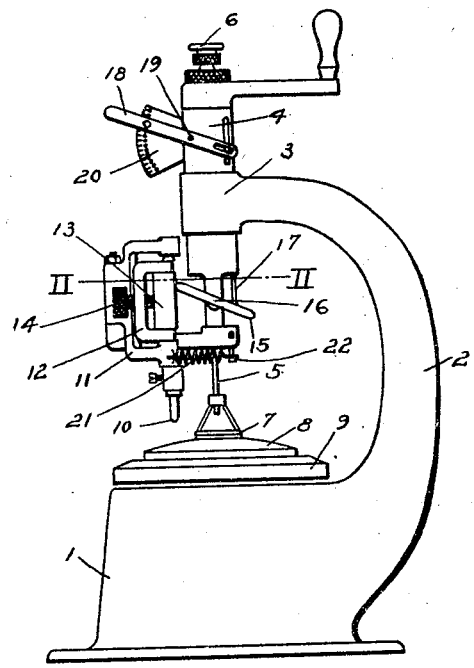
FIG. I
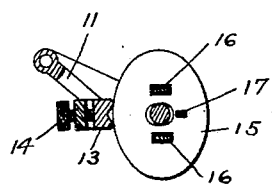
FIG. II
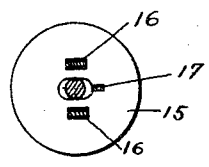
FIG. III
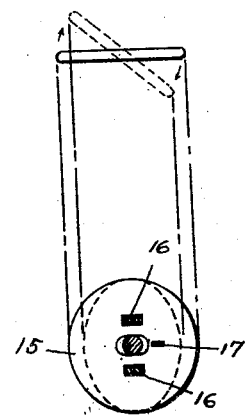
FIG. IV
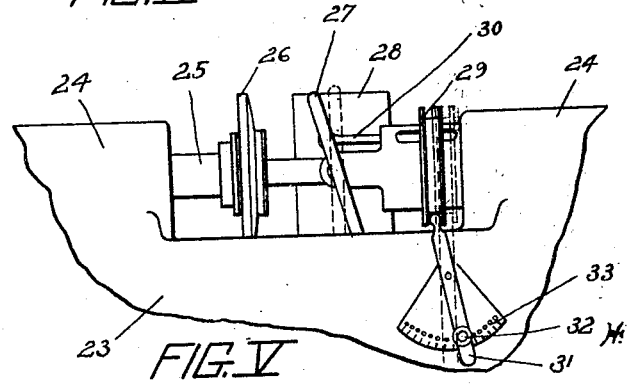
FIG. V
INVENTOR
ROBERT M. WASON
BY
H. H. Styll & H. K. Parsons
ATTORNEYS Patented Sept. 2, 1924.

1,507,535

UNITED STATES PATENT OFFICE.

ROBERT M. WASON, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

GUIDE FORMER.

Application filed September 18, 1922. Serial No. 588,880.

*To all whom it may concern:*

Be it known that I, ROBERT M. WASON, a citizen of the United States, residing at Southbridge, in the county of Worcester and State of Massachusetts, have invented certain new and useful Improvements in Guide Formers, of which the following is a specification.

This invention relates to new and useful improvements in guides or formers for glass cutting and edging machines and more particularly to movable formers adapted to be adjusted for gauging the size and shape of lenses or other objects to be cut or edged.

The well known way in which the size and shape of ophthalmic lenses are gauged when cutting or edging the same is usually by employing a number of formers of different sizes and shapes, the formers to be interchanged according to the desired size or shape to be cut or edged. This necessarily consumes considerable time in changing these formers and also requires the keeping of a number of these formers on hand so that one may be readily able to interchange one former for the other when cutting or edging different size lenses. It is, therefore, the main object of my invention to provide a single former or shaper which can be quickly and readily adjusted on the machine whereby to guide the cutter so that any number of sizes and shapes may be readily cut without changing the former with the exception of adjusting the same to various degrees with regard to the guide.

Another object of my invention is the provision of a former which is adapted to be applied to either a lens cutting or lens edging machine and so arranged whereby the same may be readily adjusted to different angles so as to guide the cutter or edging machine in cutting the proper shape and size of lens and having the machine to which the former is applied provided with the proper graduations whereby the adjustments may be readily recorded and the former adjusted to the proper degree of angles.

With the above and other objects in view the invention consists in the novel features of construction, the combination and arrangement of parts hereinafter more fully set forth, pointed out in the claims and shown in the accompanying drawings, in which—

Figure I is a side elevation of a lens cutting machine illustrating my improved former applied thereon.

Figure II is a transverse sectional view taken on the lines II—II of Figure I.

Figure III is a plan view of the former.

Figure IV is a diagrammatic view illustrating the results obtained from the adjustment of my former, and Figure V is a fragmentary plan view of a lens edging machine illustrating my improved former applied thereto In the accompanying drawings in which I have illustrated my invention 1 indicates the base of a lens cutting machine having a supporting arm 2 provided with a bracket 3 at the upper end thereof, said bracket having an opening therethru in which the sleeve 4 is mounted. Slidable thru this sleeve 4 is a rod 5 having a fingerpiece 6 at the upper end and a gripping mould 7 at the lower end which is adapted to be forced downwardly onto the lens 8 to retain the same in position upon the usual supporting table 9.

The cutting diamond 10 is supported by a movable bracket 11 which carries a U-shaped supporting member 12, said supporting member having guide portions in each end whereby to receive the guide block 13. This guide block 13 is adjustable between the ends of the supporting member 12 by means of a screw member 14 which is threaded thru the intermediate portion of the member 12 and connected with one face of the guide block 13.

The former 15 is pivoted to the lower end of the sleeve 4 as at 16 and connected to the former is a rod 17 the upper end of which is secured to the inner end of a hand lever 18. This hand lever 18 is pivotally mounted upon the sleeve 4 as at 19 and moves over an arcuate plate 20 provided with suitable graduations whereby to indicate the amount of adjustment imparted to the former 15.

Attention is called to Figure I wherein the edge of the former 15 contacts with the guide block 13 and it will be noted that the block 13 is yieldably retained into engagement with the former by means of a coil spring 21, one end of which is connected to the bracket 11 while the other end is connected to a stationary support 22. The angular adjustment of the former 15 readily guides the block 13 which in turn guides the cutter 10 over the surface of the lens 8 so that the desired size and shape can be readily cut from the main lens blank.

From the diagram in Figure IV it will be noted that when the former 15 is disposed in a substantially horizontal position a large substantially circular lens is cut while thru the movement of the former toward a vertical position or to an oblique position the size of the lens is reduced while the shape is made oval, the sizes being regulated and indicated thru the graduations upon the plate 20.

In Figure V, I have illustrated my invention as applied to an edging machine which includes the body member 23 having the supporting arms 24 extending outwardly therefrom for carrying the lens supports 25, said supports being arranged in opposed relation and adapted to clamp the lens 26 in position for engagement with the usual grinding stone. Attached centrally to one of the supporting members 25 is the former 27 which contacts with the former block 28 whereby the proper amount of material will be removed from the edge of the lens 26.

Mounted upon one of the arms 24 is a supporting member 29 having attached thereto the connecting member 30 which is connected to the former 27. The support is attached to one end of a lever 31 pivoted upon any portion of the body 23 or arm 24 and provided with a handle 32 whereby thru the manipulation of the handle 32 the former 27 may be readily adjusted to various positions as indicated by the dotted lines so that various sized lenses may be edged without changing the type of former used as is the well known custom. It will be apparent that by adjusting the hand lever 32 over the graduation portion 33 the supporting member 29 will be manipulated to adjust the former 27, the graduations 33 setting forth the various positions required of the former. In this form of the invention the former is substantially the same as in the form illustrated in Figure I, but the application and mounting of the former slightly differs although the principle and objects of the device are substantially the same.

What I claim is—

1. A former of the character described, comprising a disc, a link connected thereto, a lever pivoted to the link whereby upon adjustment of the lever the disc will be tilted, and means to maintain the lever in the desired adjustment.

2. A lens cutter of the class described, including a cutter member, a disc associated with the cutter, means to hold the cutter member in contact with the disc, a link connected to the disc, means connected to the link whereby the disc may be tilted thus causing the cutter to follow a circular or elliptical path, depending on the adjustment of the disc, and means to hold the disc in the desired adjustment.

ROBERT M. WASON.